United States Patent Office 3,160,634
Patented Dec. 8, 1964

3,160,634
2-NITRO-1,3-BIS(3-OXAZOLIDINYL)-PROPANE COMPOUNDS AND THEIR PREPARATION
Edward B. Hodge, Terre Haute, Ind., assignor to Commercial Solvents Corporation, New York, N.Y., a corporation of Maryland
No Drawing. Filed Dec. 5, 1961, Ser. No. 157,274
16 Claims. (Cl. 260—307)

My invention relates to novel compositions of matter. More particularly my invention relates to novel 1,3-bis[3-(oxazolidinyl)]propanes having the general formula:

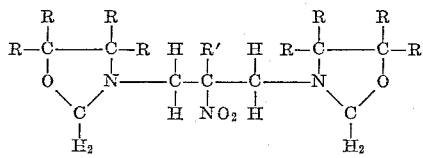

wherein R is lower alkyl, hydrogen, or lower hydroxyalkyl, and R' is lower alkyl.

My new compounds result from the condensation of formaldehyde, a lower nitro-substituted alkane, and an oxazolidine. Examples of my new compositions include 2-nitro-2-methyl-1,3-bis[3-(4,4-dimethyloxazolidinyl)]-propane,
2-nitro-2-ethyl-1,3-bis-[3-(4,4-dimethyloxazolidinyl)]-propane,
2-nitro-2-methyl-1,3-bis[3-(4,4-dihydroxymethyloxazolidinyl)]propane,
2-nitro-2-methyl-1,3-bis[3-(oxazolidinyl)]propane,
2-nitro-2-methyl-1,3-bis[3-(4-propyloxazolidinyl)]-propane,
2-nitro-2-methyl-1,3-bis-[4-(5-methyloxazolidinyl)]-propane, etc., and the like.

The compounds of my invention are produced by a condensation reaction which consists of heating a mixture of formaldehyde, lower nitroalkane and oxazolidine to form my new compounds with accompanying liberation of water.

Generally, in preparing my new compounds, I prefer to utilize the theoretical amounts of reactants. Thus, for every mole of nitroalkane I prefer to utilize 2 moles of formaldehyde and 2 moles of oxazolidine.

In carrying out my reaction, although it is not absolutely necessary, I generally prefer to employ a solvent such as water or the lower alcohols. The excess solvent and product water can be removed after formation of my new compounds by simple distillation to obtain the products of my invention.

The starting oxazolidines which are utilized in my invention are those having the following general formula:

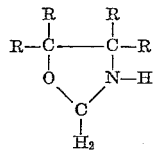

wherein R is lower alkyl, hydrogen, or lower hydroxyalkyl. Such oxazolidines include 4,4-dimethyloxazolidine, 4,4-diethyloxazolidine, 4,4-dihydroxymethyloxazolidine, 4-propyloxazolidine, 5-methyloxazolidine, oxazolidine, etc., and the like. Such oxazolidines are readily available and are easily prepared by condensing an amino alcohol having at least one hydroxyl group on the carbon atom adjacent to the carbon atom to which the amino group is attached with a lower aldehyde in the presence of an inert hydrocarbon solvent such as benzene, toluene, xylene, etc. Included among the amino alcohols which can be utilized in preparing the oxazolidines used in my reaction include 2-amino-2-methyl-1-propanol, tris(hydroxymethyl)aminomethane, ethanolamine, isopropanolamine, etc., and the like.

The novel compositions of my invention possess bactericidal and fungicidal properties and are also found to be useful as stabilizing agents in petroleum lubricants.

The following examples are offered to illustrate my invention, yet I do not intend to be limited to the specific compounds, starting materials, or procedures described therein. I intend to include all equivalents obvious to the art.

EXAMPLE I

To a reaction vessel containing 200 milliliters of benzene was added a 60-gram portion of paraformaldehyde to form a mixture. To the mixture were then added 178 grams of 2-amino-2-methyl-1-propanol and the resulting mixture was refluxed for 5 hours. At the end of the 5-hour period, the refluxed material was distilled at atmospheric pressure to obtain 144 grams of 4,4-dimethyloxazolidine.

EXAMPLE II

To a reaction vessel containing 38 grams of 1-nitroethane and 75 milliliters of 37% aqueous formaldehyde were slowly added 101 grams of the 4,4-dimethyloxazolidine prepared in Example I to form a mixture. The resulting mixture was stirred for a period of two hours while maintaining the mixture at a temperature of about 60–70° C. At the end of the 2-hour period, the resulting product was allowed to separate into an oil layer and a water layer and these layers were separated by decantation. The oil layer was then concentrated under reduced pressure to give 134 grams of 2-nitro-2-methyl-1,3-bis[3-(4,4-dimethyloxazolidinyl)]propane.

EXAMPLE III

The procedure of Example II was carried out with the exception that 4,4-diethyloxazolidine and 1-nitropropane were utilized instead of 4,4-dimethyloxazolidine and nitroethane to obtain 2-nitro-2-ethyl-1,3-bis[3-(4,4-diethyloxazolidinyl)]propane.

EXAMPLE IV

The procedure of Example II was carried out with the exception that 4,4-dihydroxymethyloxazolidine was utilized instead of 4,4-dimethyloxazolidine to obtain 2-nitro-2 - methyl - 1,3 - bis[3 - (4,4 - dihydroxymethyloxazolidinyl)]propane.

EXAMPLE V

The procedure of Example II was carried out with the exception that oxazolidine was utilized instead of 4,4-dimethyloxazolidine to give 2-nitro - 2 - methyl - 1,3-bis[3-(oxazolidinyl)]propane.

EXAMPLE VI

The procedure of Example II was carried out with the exception that 4-propyloxazolidine was utilized instead of 4,4-dimethyloxazolidine to obtain 2-nitro-2-methyl - 1,3-bis[3-(4-propyloxazolidinyl)]propane.

EXAMPLE VII

The procedure of Example II was carried out with the exception that 5-methyloxazolidine was utilized instead of 4,4 - dimethyloxazolidine to obtain 2-nitro-2-methyl-1,3-bis[3-(5-methyloxazolidinyl)]propane.

EXAMPLE VIII

To test the use of my new compositions in cutting oils, a 25:1 water-cutting oil mixture was prepared. The cutting oil concentrate used was a proprietary cutting oil containing no bacterial inhibitors such as that sold by Texaco Incorporated under the name of Soluble Oil Texaco-V. To each of six one-gallon containers was added 1 liter of a water-cutting oil mixture. Desired amounts of my new compositions of matter were added to the cutting oil mixture in five of the containers. No inhibitor was added to the other container which was used as a control. At the beginning of the experiment each unit was inoculated with 5 mls. of a heterogeneous bacterial culture which had grown for several years in a water-cutting oil mixture. Aeration and mixing were obtained by using an air lift to continually circulate the mixture. The test was continued for a period of six weeks and during the six weeks period, 5 mls. of bacterial culture were added at periodically weekly intervals.

The following table sets out the results of the above tests.

Table I

| 1, 3–Bis[3-(oxazolidinyl)] propane | Concentration in p.p.m. in cutting oil | Number of days effective |
|---|---|---|
| 2-Nitro-2-methyl-1, 3-bis [3-(oxazolidinyl)] propane | 1,000 | 40 |
| 2-Nitro-2-methyl-1, 3-bis [3-(4, 4-dimethyloxazolidinyl)] propane | 500 | 40 |
| 2-Nitro-2-ethyl-1, 3-bis [3-(4, 4-dimethyloxazolidinyl)] propane | 1,000 | 35 |
| 2-Nitro-2-methyl-1, 3-bis [3-(4, 4-dihydroxymethyloxazolidinyl)] propane | 1,000 | 35 |
| 2-Nitro-2-methyl-1, 3-bis [3-(5-methyloxazolidinyl)] propane | 1,000 | 40 |
| Control | | 0 |

Now having described my invention, what I claim is:

1. A 1,3-bis[3-(oxazolidinyl)]propane having the following formula:

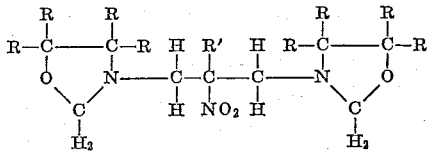

wherein R is selected from the group consisting of lower alkyl, lower hydroxyalkyl, and hydrogen and R' is lower alkyl.

2. 2 - nitro - 2 - methyl - 1,3 - bis[3 - (4,4 - dimethyloxazolidinyl)]-propane.

3. 2 - nitro - 2 - ethyl - 1,3 - bis[3 - (4,4 - dimethyloxazolidinyl)]propane.

4. 2 - nitro - 2 - methyl - 1,3 - bis[3 - (4,4 - dihydroxymethyloxazolidinyl)]propane.

5. 2 - nitro - 2 - methyl - 1,3 - bis[3 - (oxazolidinyl)]-propane.

6. 2 - nitro - 2 - methyl - 1,3 - bis[3 - (5-methyloxazolidinyl)]propane.

7. 2 - nitro - 2 - methyl - 1,3 - bis[3 - (4-propyloxazolidinyl)]propane.

8. A process for the preparation of compounds having the following formula:

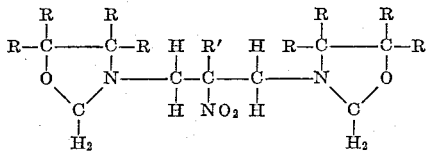

wherein R is selected from the group consisting of lower alkyl, lower hydroxyalkyl, and hydrogen and R' is lower alkyl which comprises condensing a compound having the following formula:

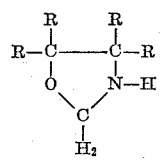

wherein R is defined as above with a lower nitroalkane having two hydrogen atoms on the alpha carbon atom and formaldehyde.

9. The process of claim 8 wherein 2 moles of formaldehyde and 2 moles of oxazolidine are utilized for each mole of nitroalkane.

10. The process of claim 9 wherein the condensation is conducted in a solvent at a temperature from about 60 to 70° C.

11. The process of claim 9 wherein the nitroalkane is 1-nitroethane.

12. The process of claim 9 wherein the nitroalkane is 1-nitropropane.

13. The process of claim 11 wherein the oxazolidine compound is 4,4-dimethyloxazolidine.

14. The process of claim 11 wherein the oxazolidine compound is 4,4-dihydroxymethyloxazolidine.

15. The process of claim 11 wherein the oxazolidine compound is 5-methyloxazolidine.

16. The process of claim 12 wherein the oxazolidine compound is 4,4-diethyloxazolidine.

References Cited in the file of this patent

UNITED STATES PATENTS

| 2,636,038 | Brandner | Apr. 21, 1953 |
| 2,686,787 | Slack et al. | Aug. 17, 1954 |
| 2,976,244 | Bennett | Mar. 21, 1961 |
| 2,987,479 | Bennett | June 6, 1961 |